(12) United States Patent
White

(10) Patent No.: US 8,191,660 B1
(45) Date of Patent: Jun. 5, 2012

(54) VEHICLE HYBRID APPARATUS

(76) Inventor: Matthew White, Sterling, VA (US)

( * ) Notice: Subject to any disclaimer, the term of this patent is extended or adjusted under 35 U.S.C. 154(b) by 448 days.

(21) Appl. No.: 12/495,925

(22) Filed: Jul. 1, 2009

(51) Int. Cl.
*B60K 6/42* (2007.10)

(52) U.S. Cl. .................................. 180/65.22; 180/65.31

(58) Field of Classification Search ............... 180/65.21, 180/65.225, 65.245, 65.275, 65.31, 65.22
See application file for complete search history.

(56) References Cited

U.S. PATENT DOCUMENTS

| | | | | |
|---|---|---|---|---|
| 4,233,858 A | * | 11/1980 | Rowlett | ............................. 475/5 |
| 4,720,638 A | | 1/1988 | Vollbrecht | |
| 5,237,260 A | | 8/1993 | Takakado et al. | |
| 5,845,731 A | * | 12/1998 | Buglione et al. | ............ 180/65.23 |
| 6,554,088 B2 | * | 4/2003 | Severinsky et al. | ......... 180/65.23 |
| 7,104,347 B2 | * | 9/2006 | Severinsky et al. | ......... 180/65.23 |
| 7,165,523 B1 | | 1/2007 | Richard | |
| 7,302,926 B1 | | 12/2007 | Kiker | |
| 227,592 A1 | | 9/2008 | Steffen et al. | |
| 2007/0034030 A1 | * | 2/2007 | Suzuki et al. | ........................ 74/6 |

* cited by examiner

*Primary Examiner* — J. Allen Shriver, II
*Assistant Examiner* — Bridget Avery

(57) ABSTRACT

The vehicle hybrid apparatus provides a combined electrical unit that provides three functions that are starter motor, generator, and auxiliary drive motor. The apparatus attaches to a vehicle in typical starter motor location, with starter motor mounts being used. The pinion gear of the combined electrical unit is continuously engaged with the existing flywheel of the existing fuel engine. Electrical components of the apparatus are connected to existing automobile components and, together, these decide which function, whether starter motor, generator, or drive motor is employed.

2 Claims, 2 Drawing Sheets

VEHICLE HYBRID APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Hybridized vehicles have come to the forefront over the past few years. Various systems have been used in creating the vehicles. Most systems alternate between the fuel driven engine and electrical drive. Some of such systems call for battery charging via electrical outlet when the batteries are depleted. Some systems provide what is termed KERS™, kinetic energy recovery system, which is currently in development within Formula 1™ racing. KERS systems typically derive stored electrical power from braking or from existing drive train momentum. With no currently noted exceptions, the systems are relatively complex, and also heavy, some extremely heavy. The current apparatus provides electrical power to accompany existing engine power, thereby conserving fuel when possible. The current apparatus provides a combined electrical unit comprising a starter motor, a drive motor, and a generator, along with components necessary to properly engage and operate the combined electrical unit.

FIELD OF THE INVENTION

The vehicle hybrid apparatus relates to hybrid systems that incorporate both fuel engine drive and electric drive into a vehicle and more especially to an apparatus with a combined electrical unit that provides three functions that are starter motor, generator, and auxiliary drive motor. The apparatus attaches to a vehicle in typical starter motor location, with starter motor mounts being used.

SUMMARY OF THE INVENTION

The general purpose of the vehicle hybrid apparatus, described subsequently in greater detail, is to provide a vehicle hybrid apparatus which has many novel features that result in an improved vehicle hybrid apparatus which is not anticipated, rendered obvious, suggested, or even implied by prior art, either alone or in combination thereof.

To attain this, vehicle hybrid apparatus negates the extreme expense and complexity in saving fuel through hybridization of an automobile versus conventional pursuits in vehicle hybrid designs. The apparatus retrofits to an existing automobile and is also incorporated into manufacture of new autos. The apparatus provides a multi-function combined electrical unit that performs three functions, with the aid of electrical components and connections. Auxiliary power is supplied to the fuel engine of an automobile by cruise control operation. The program module of the apparatus is connected to the cruise control and ECU of the auto.

Operation of the cruise control signals the program module, that in turn signals the combined potentiometer/solenoid to command the combined electrical unit to add power to the engine's flywheel via the continually engaged pinion gear of the combined electrical unit. By providing stored electrical power to aid in propulsion of the automobile, fuel savings is experienced. The combined electrical unit also provides starter motor function in starting the fuel engine. The program module of the apparatus is connected to the starter switch of the auto. The starter switch signals the program module, which signals the potentiometer/solenoid to supply a voltage sufficient to spin the flywheel of the engine and begin the engine's operation, in typical fuel engine mode. Battery charging is also supplied to an automobile under normal driving conditions, when the cruise control is not engaged, for example. It is important to note that cruise control function and apparatus function can be altered to engage auxiliary power or charging power as decided upon in a particular application. The program module is altered to perform the desired functions.

A very important feature of the apparatus is that the combined electrical unit attaches to an automobile where a starter motor typically attaches. The importance of this basic feature cannot be overstated. A further advantage of the apparatus is that the typically employed alternator of an auto can be optionally negated.

Thus has been broadly outlined the more important features of the improved vehicle hybrid apparatus so that the detailed description thereof that follows may be better understood and in order that the present contribution to the art may be better appreciated.

An object of the vehicle hybrid apparatus is to negate extreme expense and complexity in saving fuel through hybridization of an automobile.

Another object of the vehicle hybrid apparatus is to retrofit to an existing automobile.

A further object of the vehicle hybrid apparatus is to be incorporated into the manufacture of new automobiles.

An added object of the vehicle hybrid apparatus is to provide a multi-function combined electrical unit.

And, an object of the vehicle hybrid apparatus is to provide auxiliary power to the fuel engine of an automobile.

Another object of the vehicle hybrid apparatus is to provide starter motor function.

Still another object of the vehicle hybrid apparatus is to provide battery charging to an automobile.

Yet another object of the vehicle hybrid apparatus is to attach to an existing automobile where a starter motor typically attaches.

Still another object of the vehicle hybrid apparatus is to optionally negate the use of an alternator.

These together with additional objects, features and advantages of the improved vehicle hybrid apparatus will be readily apparent to those of ordinary skill in the art upon reading the following detailed description of presently preferred, but nonetheless illustrative, embodiments of the improved vehicle hybrid apparatus when taken in conjunction with the accompanying drawings.

In this respect, before explaining the current embodiments of the improved vehicle hybrid apparatus in detail, it is to be understood that the vehicle hybrid apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved vehicle hybrid apparatus. It is therefore important that the claims be regarded as including such equivalent constructions insofar as they do not depart from the spirit and scope of the vehicle hybrid apparatus. It is also to be understood that the phraseology and terminology employed herein are for purposes of description and should not be regarded as limiting.

DETAILED DESCRIPTION OF THE DRAWINGS

Figure 1:
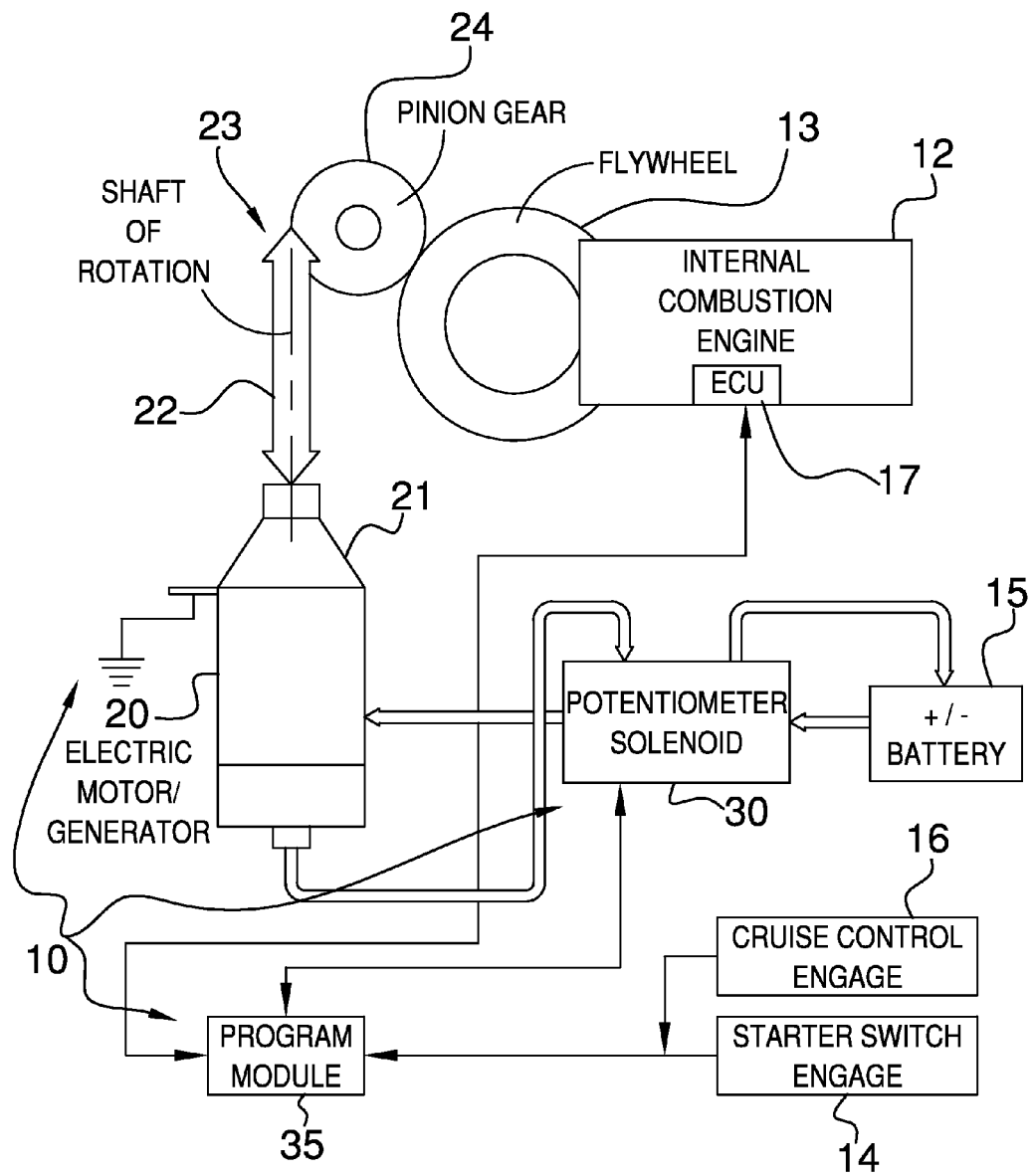
FIG. 1 is a schematic block diagram of the apparatus and its relationship to a fuel engined automobile.
Figure 2:
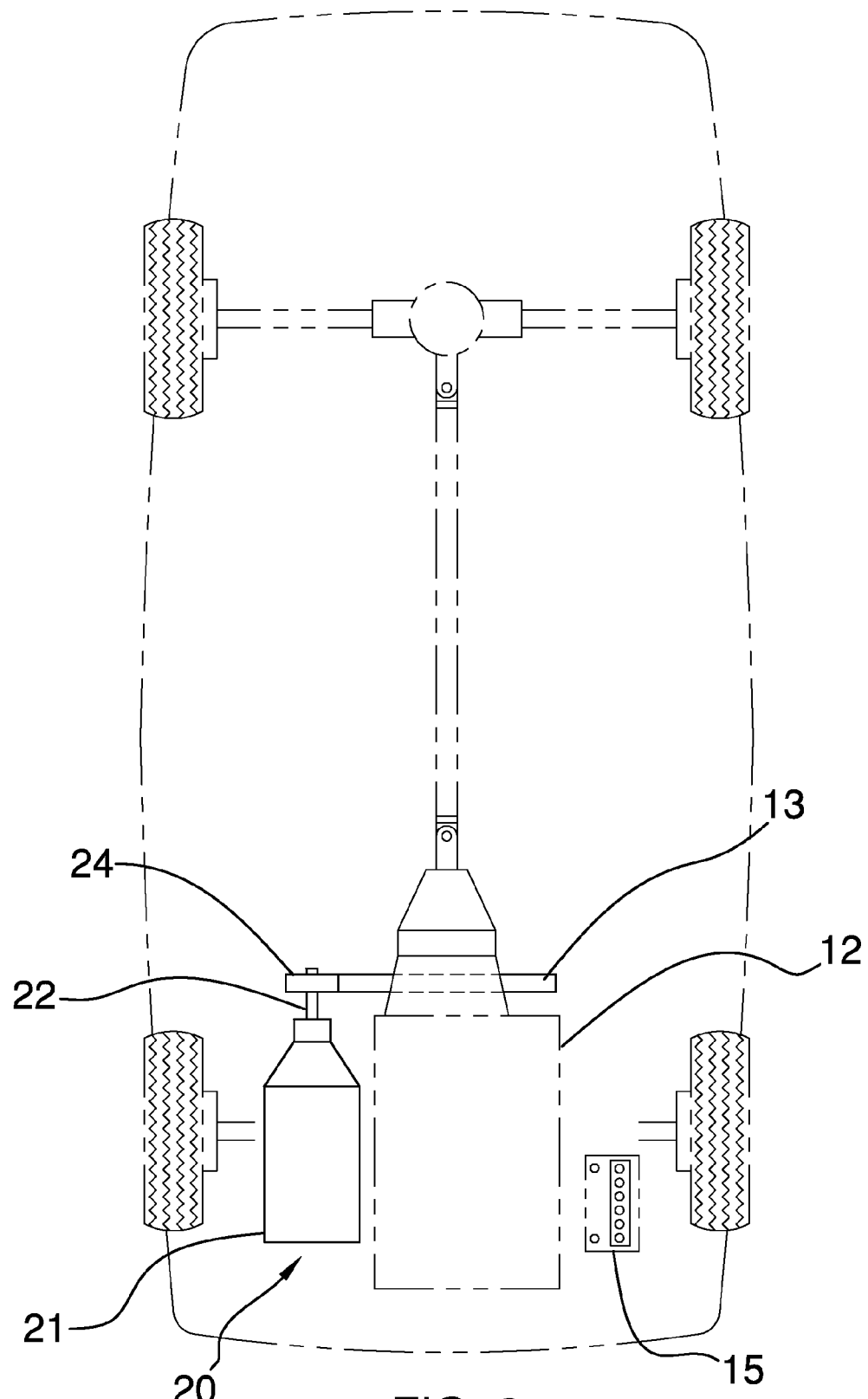
FIG. 2 is a top plan view of the combined electrical unit in cooperation with an existing automobile flywheel.

With reference now to the drawings, and in particular FIGS. 1 through 2 thereof, the principles and concepts of the vehicle hybrid apparatus generally designated by the reference number 10 will be described.

Referring to FIGS. 1 and 2, the apparatus 10 comprises the combined electrical unit 20 within a housing 21 that shields the unit 20 from damage, debris, and moisture invasion. The combined electrical unit 20 comprises a single combined starter motor, drive motor, and generator that perform these three functions under command from the program module 35. The drive shaft 22 is coupled to and extended from the combined electrical unit 20. The pinion gear 24 is disposed on the shaft end 23 of the drive shaft 22. The pinion gear 24 varies significantly from a typical automobile application in that the pinion gear 24 is continually engaged with the existing flywheel 13 of an existing fuel driven engine 12 of an existing automobile. The housing 21 is attached to the existing engine 12 via existing attachment means previously used by the automobile's starter. No modifications are necessary.

Continuing to refer to FIGS. 1 and 2, the program module 35 is in communication with the existing starter switch 14 of the automobile. The program module 35 is also in communication with the existing ECU (electronic control unit) 17 of the automobile. The program module 35 is further in communication with an existing cruise control 16.

The combined potentiometer/solenoid 30 is installed on the existing automobile. The potentiometer/solenoid 30 is in communication with the combined electrical unit 20 and the program module 35. The potentiometer/solenoid 30 is also in communication with the existing battery 15 of the automobile. It is of note that additional batteries 15 added to the automobile improve the performance of the apparatus 10, as does the addition of newer technology batteries 15 that are an improvement over older lead/acid battery 15 designs. The potentiometer/solenoid 30 selectively applies differing voltages to the combined electrical unit 20.

Continuing to refer to FIGS. 1 and 2, the potentiometer/solenoid 35 supplies a voltage sufficient to start the fuel engine 12 via the combined electrical unit 20 upon a start signal transmitted from the program module 35 from the starter switch 14. Further, the potentiometer/solenoid 30 supplies a different voltage to the combined electrical unit 20 to add torque to the flywheel 13 via the combined electrical unit 20 in an auxiliary drive addition to the engine 12. This function is initiated by the cruise control 16. This auxiliary drive function is the fuel saving feature of the apparatus 10. Further, the potentiometer/solenoid 30 initiates the generator of the combined electrical unit 20 in supplying battery charge to the battery 15 under fuel engine 12 operation only. An existing alternator may be used in conjunction with the apparatus 10. The apparatus 10 may also negate the need for an alternator.

With respect to the above description then, it is to be realized that the optimum dimensional relationships for the parts of the vehicle hybrid apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the vehicle hybrid apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the vehicle hybrid apparatus may be used.

Therefore, the foregoing is considered as illustrative only of the principles of the vehicle hybrid apparatus. Further, since numerous modifications and changes will readily occur to those skilled in the art, it is not desired to limit the vehicle hybrid apparatus to the exact construction and operation shown and described, and accordingly, all suitable modifications and equivalents may be resorted to, falling within the scope of the vehicle hybrid apparatus.

What is claimed is:

1. A vehicle hybrid apparatus, comprising, in combination:
   a combined electrical unit within a housing, the unit comprising a combined starter motor, drive motor, and generator;
   a drive shaft coupled to and extended from the combined electrical unit;
   a pinion gear disposed on a shaft end of the drive shaft, the pinion gear continually engaged with an existing flywheel of an existing fuel driven engine of an existing automobile, the housing attached to the existing engine via an existing starter motor attachment means;
   means for communicating with an existing starter switch, an existing battery, an existing ECU, and an existing cruise control of automobile, whereby the combined electrical unit selectively starts the fuel engine, the combined electrical unit selectively adds auxiliary power to the existing flywheel, the combined electrical unit selectively charges the existing battery.

2. A vehicle hybrid apparatus, comprising, in combination:
   a combined electrical unit within a housing, the unit comprising a combined starter motor, drive motor, and generator;
   a drive shaft coupled to and extended from the combined electrical unit;
   a pinion gear disposed on a shaft end of the drive shaft, the pinion gear continually engaged with an existing flywheel of an existing fuel driven engine of an existing automobile, the housing attached to the existing engine via an existing starter motor attachment means;
   a program module in communication with an existing starter switch, an existing cruise control, and an existing ECU of the automobile;
   a combined potentiometer/solenoid installed on the existing automobile, the potentiometer/solenoid in communication with the combined electrical unit, the program module, and an existing battery, the potentiometer/solenoid signaling the combined starter motor, drive motor, and generator;
   whereby the potentiometer/solenoid supplies a voltage sufficient to start the fuel engine via the combined electrical unit upon a start signal from the starter switch, the potentiometer/solenoid supplies a differing voltage to the combined electrical unit by a signal from the cruise control in providing an auxiliary drive addition of the drive motor to the flywheel, the potentiometer/solenoid initiates the generator in supplying a battery charge to the battery under fuel engine operation only.

* * * * *